(12) United States Patent  (10) Patent No.: US 9,296,163 B2
Sakurai  (45) Date of Patent: Mar. 29, 2016

(54) METALLIC TONED DIAL PLATE AND PRODUCTION METHOD OF THE SAME

(71) Applicant: Yazaki Corporation, Tokyo (JP)

(72) Inventor: Isamu Sakurai, Shimada (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/554,579

(22) Filed: Nov. 26, 2014

(65) Prior Publication Data

US 2015/0079289 A1  Mar. 19, 2015

Related U.S. Application Data

(62) Division of application No. 13/569,938, filed on Aug. 8, 2012.

(30) Foreign Application Priority Data

Aug. 11, 2011  (JP) ................ 2011-175841

(51) Int. Cl.
| | | |
|---|---|---|
| *B29D 16/00* | (2006.01) | |
| *B60K 35/00* | (2006.01) | |
| *C23C 30/00* | (2006.01) | |
| *B29K 101/00* | (2006.01) | |

(52) U.S. Cl.
CPC ............ *B29D 16/00* (2013.01); *B60K 35/00* (2013.01); *C23C 30/00* (2013.01); *B29K 2101/00* (2013.01); *B29K 2995/0026* (2013.01); *B60K 2350/2086* (2013.01); *Y10T 428/218* (2015.01); *Y10T 428/24355* (2015.01)

(58) Field of Classification Search
CPC ........................................ B29D 16/00
See application file for complete search history.

(56) References Cited

U.S. PATENT DOCUMENTS

| | | | |
|---|---|---|---|
| 4,165,394 A | | 8/1979 | Ehrbar et al. |
| 4,327,428 A | * | 4/1982 | Enomoto et al. ............. 368/232 |
| 6,538,959 B1 | | 3/2003 | Yamaguchi et al. |

(Continued)

FOREIGN PATENT DOCUMENTS

| | | | |
|---|---|---|---|
| AT | 198200 B | | 6/1958 |
| CH | GB1036585 | * | 5/1963 |

(Continued)

OTHER PUBLICATIONS

Office Action dated Feb. 12, 2015 issued for corresponding Chinese Patent Application No. 201210285240.1.

(Continued)

*Primary Examiner* — Nathan T Leong
(74) *Attorney, Agent, or Firm* — Locke Lord LLP (57) ABSTRACT

A metallic layer is formed on a resin-made dial plate main body by surface treatment. A front surface of the main body is provided with a circular or arc-shaped second design face around a rotation shaft of a pointer, and a first inwardly inclined face and an outwardly inclined face continued to the second design face so as to rim an inside and an outside of the second design face and gradually extending toward a rear surface as extending away from the second design face. These first inwardly inclined face and outwardly inclined face are provided on a smooth face. Other portions except these first inwardly inclined face and outwardly inclined face are provided on a corrugated face on which a plurality of convexes and concaves are formed and having a surface roughness rougher than the smooth face.

3 Claims, 5 Drawing Sheets

(56) References Cited

U.S. PATENT DOCUMENTS

| | | |
|---|---|---|
| 6,753,068 B2 | 6/2004 | Nakamura et al. |
| 8,394,507 B2 | 3/2013 | Tomantschger et al. |
| 2010/0304171 A1 | 12/2010 | Tomantschger et al. |

FOREIGN PATENT DOCUMENTS

| | | | |
|---|---|---|---|
| DE | 2725775 A1 | | 8/1978 |
| DE | 69812613 T2 | | 2/2004 |
| GB | 1036585 A | | 7/1966 |
| GB | 2032657 | * | 5/1980 |
| GB | 2032657 A | | 5/1980 |
| JP | 2005-241565 A | | 9/2005 |
| JP | 2007-051938 A | | 3/2007 |
| JP | 2007-232739 A | | 9/2007 |

OTHER PUBLICATIONS

Office Action dated Apr. 17, 2015 issued for corresponding German Patent Application No. 10 2012 107 247.7.

* cited by examiner

METALLIC TONED DIAL PLATE AND PRODUCTION METHOD OF THE SAME

CROSS REFERENCE TO RELATED APPLICATIONS

This application is a divisional application of U.S. application Ser. No. 13/569,938, filed Aug. 8, 2012 which claims the right of priority under 35 U.S.C. §119 based on Japanese Patent Application No. 2011-175841 filed Aug. 11, 2011, the contents of which are hereby incorporated by reference.

BACKGROUND OF THE INVENTION

1. Technical Field

The present invention relates to a metallic toned dial plate and a production method of the metallic toned dial plate, in particular, to the metallic toned dial plate and the production method of the metallic toned dial plate to produce metallic feeling.

2. Background Art

As the above metallic toned dial plate, for example, a display plate is described in PTL 1. This display plate is made of metal such as stainless steel or aluminum. A spin-shaped moiré pattern centering around a rotation axis of a pointer is provided at a front side of the display plate. Further, the display plate is provided with an opening exposing a display device arranged at a rear side of the display plate. A tapered face on which the moiré pattern is not formed is provided on a peripheral edge of the opening. Further, a metallic toned rim is formed on this tapered face.

According to the above display plate described in PTL 1, a high-class feeling and a metallic feeling are produced by comparing the moiré pattern with the metallic toned rim. However, because the display plate described in PTL 1 is formed from a real metal plate such as stainless steel or aluminum, it is needed to cut the metal plate one by one with machine work for providing the moiré pattern and the metallic toned rim, and there is a cost problem.

Further, as a dial plate producing the metallic feeling, for example, it is described in PTL 2. This dial plate is made of transparent resin such as polycarbonate, and provided with a circular planar portion corresponding to a rotation area of a pointer, and an inclined portion continued outward from the planar portion. Then, the metallic feeling is produced by making a light-shield printing on the dial plate so as to illuminate a folded portion which is a connecting portion between the planar portion and the inclined portion.

However, the dial plate described in PTL 2 only produces a metallic edge feeling by illuminating the folded portion, and there is a problem that it is hard to reproduce the metallic feeling. Further, because it is not appealing to illuminate the folded portion in the daytime, there is a problem that the metallic edge feeling cannot be produced in the daytime.

CITATION LIST

Patent Literature

PTL 1: JP, A, 2005-241565
PTL 2: JP, A, 2007-51938

SUMMARY OF INVENTION

Technical Problem

Accordingly, an object of the present invention is to provide a low-cost metallic toned dial plate producing a metallic feeling. Further, another object of the present invention is to provide a production method of a metallic toned dial plate for producing a low-cost dial plate producing the metallic feeling.

Solution to Problem

For achieving the object, according to a first aspect of the present invention, there is provided a metallic toned dial plate producing a metallic feeling including:

a resin-made main body provided with a smooth face and a corrugated face on which a plurality of convexes and concaves are formed and having a surface roughness rougher than the smooth face, both provided on a front surface of the main body; and a metallic layer made by surface treatment and formed on the smooth face and the corrugated face of the main body.

According to a second aspect of the present invention, there is provided the metallic toned dial plate as described in the first aspect, wherein the front surface of the main body is provided with a circular or an arc-shaped face centering around a rotation shaft of a pointer, and an inclined face continued to the circular or arc-shaped face so as to rim an inside or an outside of the circular or arc-shaped face and gradually extending toward a rear surface as extending away from the circular or arc-shaped face, and wherein the inclined face is provided on the smooth face.

According to a third aspect of the present invention, there is provided the metallic toned dial plate as described in the second aspect, wherein a radius of a connecting portion between the inclined face and a face adjacent to the inclined face is formed equal to or lower than 0.2 millimeters.

According to a fourth aspect of the present invention, there is provided the metallic toned dial plate as described in any one of the first to third aspect, wherein a surface roughness of the smooth face of the main body is formed equal to or lower than 2 micrometers.

According to a fifth aspect of the present invention, there is provided a production method of a metallic toned dial plate producing a metallic feeling including the steps of:

producing a main body provided with a smooth face and a corrugated face on which a plurality of convexes and concaves are formed and having a surface roughness rougher than the smooth face by resin molding using a molding die provided with a smooth face and a corrugated face on which a plurality of convexes and concaves are formed and having a surface roughness rougher than the smooth face; and providing a metallic layer on the smooth face and the corrugated face of the main body by surface treatment.

According to a sixth aspect of the present invention, there is provided the production method of a metallic toned dial plate as described in the fifth aspect, further including the steps of:

providing a circular or an arc-shaped planar face centering around a rotation shaft of a pointer, and an inclined face continued to the circular or arc-shaped planar face so as to rim an inside or an outside of the circular or arc-shaped planar face and extending toward a rear surface as extending away from the circular or arc-shaped planar face on a front surface of the main body of said dial plate;

providing the inclined face on the smooth face; and respectively forming the inclined face and the face adjacent to the inclined face with individual molding dies.

Advantageous Effects of Invention

As explained the above, according to the first aspect of the present invention, a dial plate main body is made of resin, a surface of the main body is provided with a smooth face and a corrugated face, and a metallic layer is formed on the smooth face and the corrugated face of the main body by surface treatment. Thereby, a metallic toned dial plate having the smooth face and the corrugated face can be produced without processing a metal plate. Therefore, a low-cost metallic toned dial plate producing a metallic feeling can be provided.

According to the second aspect of the present invention, the main body is provided with a circular or arc-shaped face and an inclined face rimming an inside or an outside of the circular or arc-shaped face, and the inclined face is provided on the smooth face. Thereby, an outside edge or an inside edge of the circular or arc-shaped face glitters, and the metallic feeling is further improved.

According to the third aspect of the present invention, a radius of a connecting portion between the inclined face and a face adjacent to the inclined face is formed equal to or lower than 0.2 millimeters. Thereby, a physical appearance of the connecting portion is substantially the same as a connecting portion of a metallic dial plate provided with an inclined face formed by cutting a metal block, and a high-class feeling is improved.

According to the fourth aspect of the present invention, because a surface roughness of the smooth face of the main body is formed equal to or lower than 2 micrometers, a shiny feeling is produced, and the metallic feeling is further improved.

According to the fifth aspect of the present invention, a dial plate main body is made of resin, a surface of the main body is provided with a smooth face and a corrugated face, and a metallic layer is formed on the smooth face and the corrugated face of the main body by surface treatment. Thereby, a metallic toned dial plate having the smooth face and the corrugated face can be produced without processing a metal plate. Therefore, a low-cost metallic toned dial plate producing a metallic feeling can be provided.

According to the sixth aspect of the present invention, because the inclined face and the face adjacent to the inclined face are respectively formed with individual molding dies, a radius of the connecting portion between the inclined face and the face adjacent to the inclined face can be substantially zero, thereby the high-class feeling of the metallic toned dial plate can be improved.

These and other objects, features, and advantages of the present invention will become more apparent upon reading of the following detailed description along with the accompanied drawings.

DESCRIPTION OF EMBODIMENTS

Figure 1:
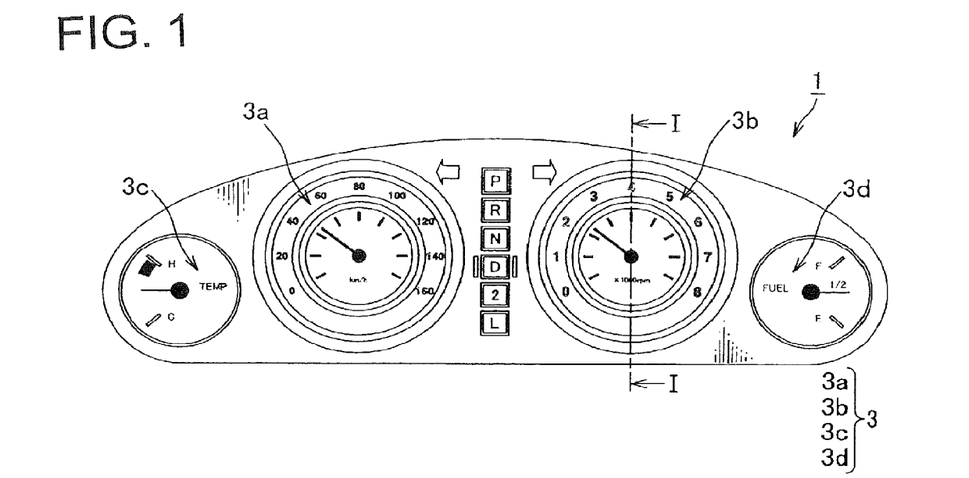
FIG. 1 is a front view showing a combination meter into which a metallic toned dial plate according to the present invention is incorporated.
Figure 2:
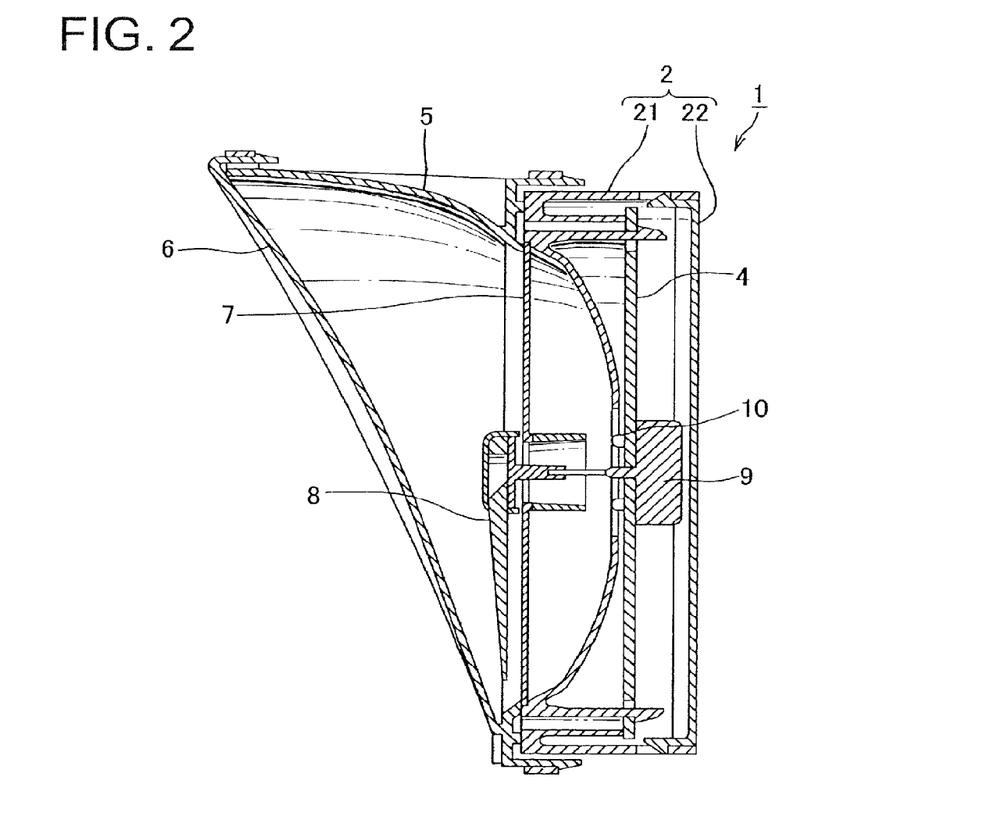
FIG. 2 is a sectional view taken on line I-I of FIG. 1.
Figure 3:
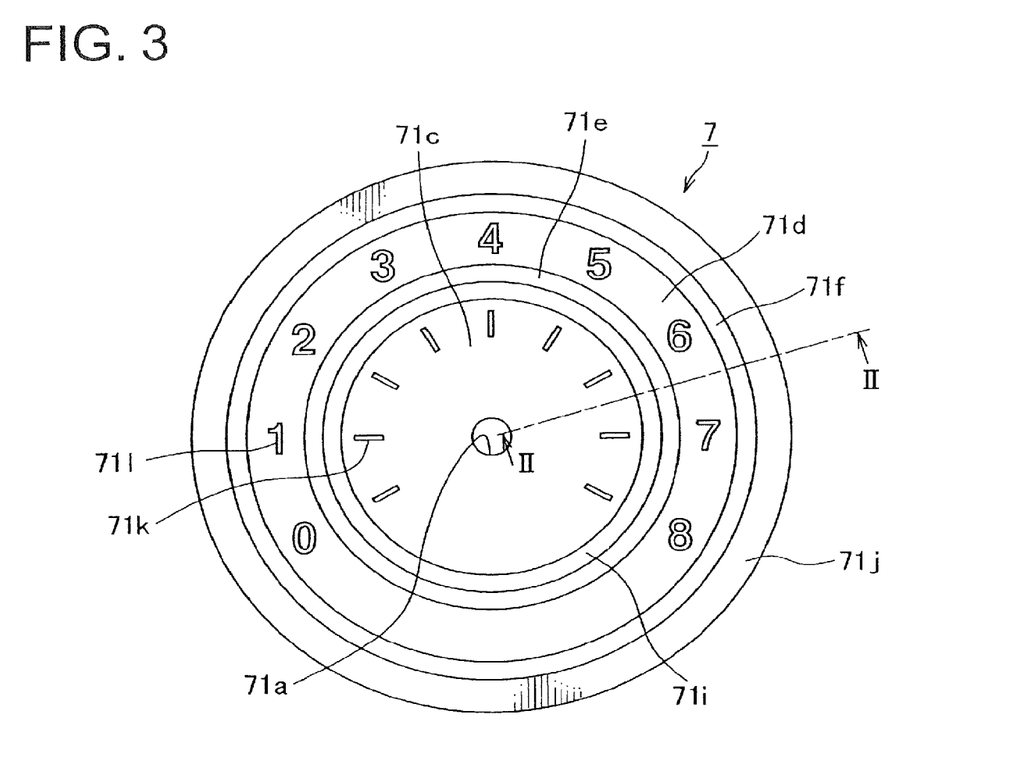
FIG. 3 is a front view showing the metallic toned dial plate as a component of the combination meter shown in FIG. 1.
Figure 4:
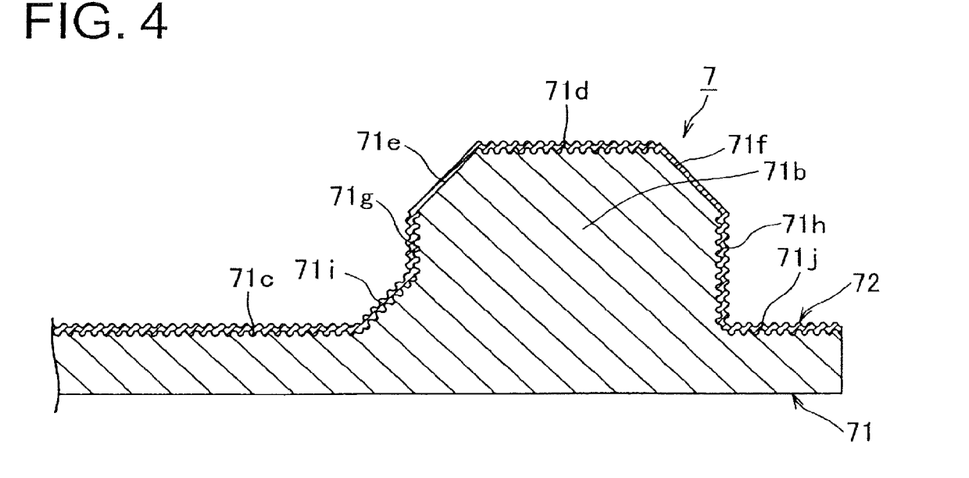
FIG. 4 is a sectional view taken on line II-II of FIG. 3.

Hereinafter, a combination meter into which a metallic toned dial plate according to the present invention is incorporated will be explained with reference to FIGS. 1 to 4. FIG. 1 is a front view showing a combination meter into which a metallic toned dial plate according to the present invention is incorporated. FIG. 2 is a sectional view taken on line I-I of FIG. 1. FIG. 3 is a front view showing the metallic toned dial plate as a component of the combination meter shown in FIG. 1. FIG. 4 is a sectional view taken on line II-II of FIG. 3.

The metallic toned dial plate according to an embodiment of the present invention is used in the combination meter shown in FIG. 1. The combination mater 1 is mounted on a moving object such as a vehicle, and displays a condition of the moving object with respect to a crew of the moving object.

As shown in FIGS. 1 and 2, the combination mater 1 includes: a case 2; a display instrument 3; a wiring board 4; a bezel 5; and a front glass 6. The case 2 is made of synthetic resin, and as shown in FIG. 2, includes: a substantially tubular case main body 21; and a rear cover 22 for covering an opening at a rear side of the case main body 21. The later-described display instrument and the wiring board 4 are received in the case 2.

As shown in FIG. 1, for example, the display instrument 3 includes: a speedometer 3a displaying a speed of a vehicle; a tachometer 3b displaying the number of revolutions of an engine; a water temperature meter 3c displaying a water temperature; and a fuel meter 3d displaying a remaining fuel. As shown in FIG. 2, each of these meters 3a to 3d includes: a metallic toned dial plate 7; a pointer 8, a movement 9; and an LED 10.

Next, the metallic toned dial plate 7 used in the speedometer 3a and the tachometer 3b will be explained with reference to FIGS. 3 and 4. Because configurations of the metallic toned dial plates 7 of the speedometer 3a and the tachometer 3b are substantially the same, the metallic toned dial plate 7 of the tachometer 3b will be explained representatively.

As shown in FIG. 4, the metallic toned dial plate 7 includes: a disk-shaped main body 71; and a metallic layer 72 provided on a front side of the main body 71. The main body 71 is made of transparent resin such as acrylic or polycarbonate. A through-hole 71a (FIG. 3) for inserting a rotation shaft of the later-described movement 9 is provided on the center of the main body 71.

A circular (ring-shaped) convex 71b centering on the through-hole 71a is provided on the front side of the main body 71. This convex 71b is provided at an inside of an outer edge of the main body 71. Further, the front side of the main body 71 is provided with a first design face 71c, a second design face 71d, a first inwardly inclined face 71e, an outwardly inclined face 71f, an inner side face 71g, an outer side face 71h, a second inwardly inclined face 71i, and an outer edge face 71j.

The first design face 71c is formed on a plane surrounded by the concave 71b. A graduation design 71k (FIG. 3) is formed on the first design face 71c by the later-described metallic layer 72. The second design face 71d is formed on a plane on an upper surface of the convex 71b substantially parallel to the first design face 71c. A numeral design 71l (FIG. 3) is formed on the second design face 71d by the later-described metallic layer 72. As obvious by the fact that the second design face 71d is provided on the upper surface of the convex 71b, the second design face 71d is formed in a circular shape centering on a rotation shaft of the pointer 8, and corresponds to the planar face in claims.

The first inwardly inclined face 71e is continued to the second design face 71d so as to rim an inside of the second design face 71d and formed in a inclined face gradually extending toward a rear surface as extending away from the second design face 71d. The outwardly inclined face 71f is continued to the second design face 71d so as to rim an outside of the second design face 71d, and formed in an inclined face extending toward a rear surface as extending away from the second design face 71d. These first inwardly inclined face 71e and outwardly inclined face 71f correspond to the inclined face in claims. The inner side face 71g is an inner side face of the convex 71b, continued to an inside of the first inwardly inclined face 71e, and formed in a face perpendicular to the first and second design faces 71c, 71d.

The outer side face 71h is an outer side face of the convex 71b, continued to an outside of the outwardly inclined face 71f, and formed in a face perpendicular to the first and second design faces 71c, 71d. The second inwardly inclined face 71i is interposed between the inner side face 71g and the first design face 71c, and formed in an inclined face extending toward a rear surface as extending away from the second design face 71d. The outer edge face 71j is continued to an outside of the outer side face 71h, and formed in the same plane as the first design face 71c.

Figure 5:
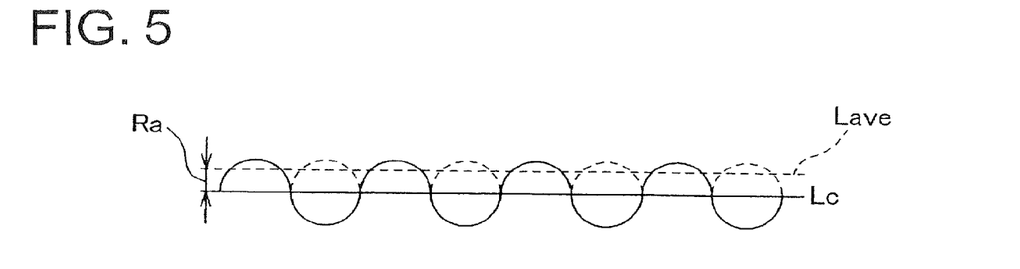
FIG. 5 is an explanatory view for explaining a surface roughness.

The first inwardly inclined face 71e and the outwardly inclined face 71f of the main body 71 are provided on a smooth face of which surface roughness Ra is equal to or lower than 2 micrometers. Here, as shown in FIG. 5, the surface roughness Ra is indicated by a distance between an average Lave and the center line Lc. The average Lave is an average of concaves and folded convexes folded at the center line Lc, and denoted by a dotted line.

The first design face 71c, the second design face 71d, the inner side face 71g, the outer side face 71h, the second inwardly inclined face 71i and the outer side face 71h except for the first inwardly inclined face 71e and the outwardly inclined face 71f of the main body 71 are provided on a corrugated face on which a plurality of convexes and concaves are formed and having a surface roughness rougher than the smooth face.

Figure 6A:
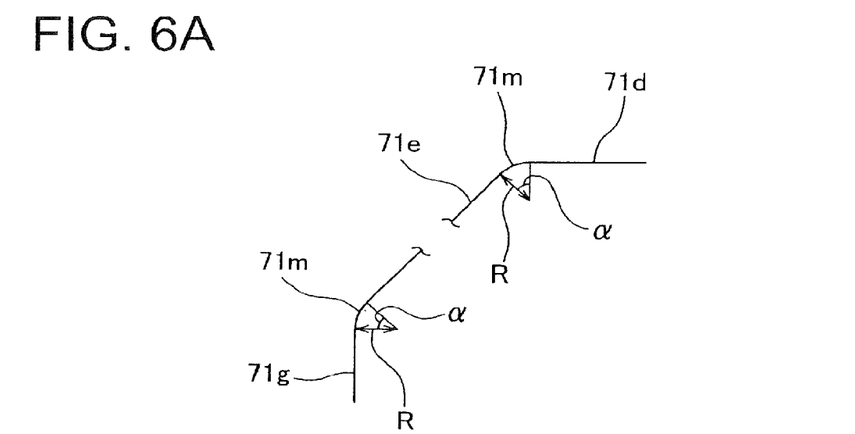
FIG. 6A is a partially enlarged view showing a connecting portion between a first inwardly inclined face, a second design face and an inner side face.
Figure 6B:
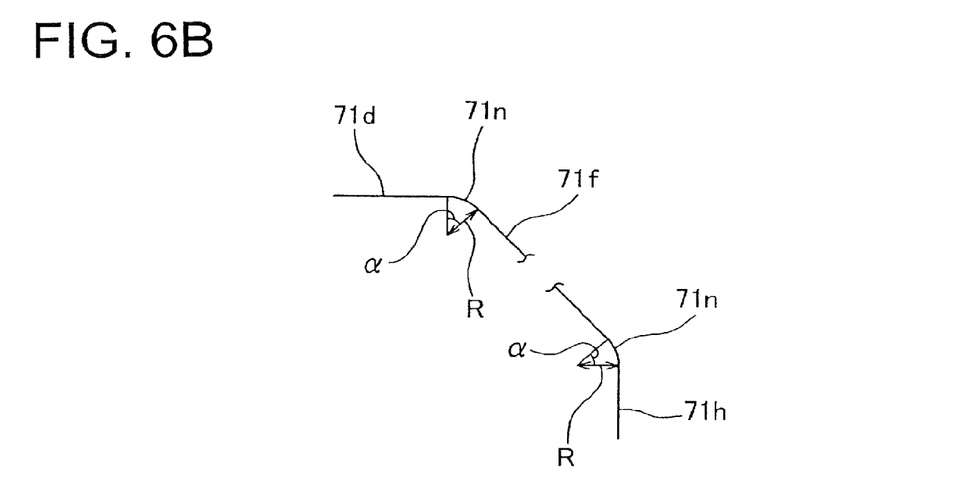
FIG. 6B is a partially enlarged view showing a connecting portion between an outwardly inclined face, a second design face and an inner side face.

Further, as shown in FIG. 6A, connecting portions 71m between the first inwardly inclined face 71e and the second design face 71d, and between the first inwardly inclined face 71e and the inner side face 71g are a curved face. Further, as shown in FIG. 6B, connecting portions 71n between the outwardly inclined face 71f and the second design face 71d, and between the outwardly inclined face 71f and the outer side face 71h are a curved face. As this angle α becomes smaller, the contrast with the second design face 71d becomes clearer, and the high-class feeling is improved. Further, when radii R of the connecting portions 71m, 71n become as small as possible using the molding die, widths of the connecting portions 71m, 71n become small, and the high class feeling is further improved. In this embodiment, the radii R of the connecting portions 71m, 71n are equal to or lower than 0.2 millimeters.

Figure 7A:
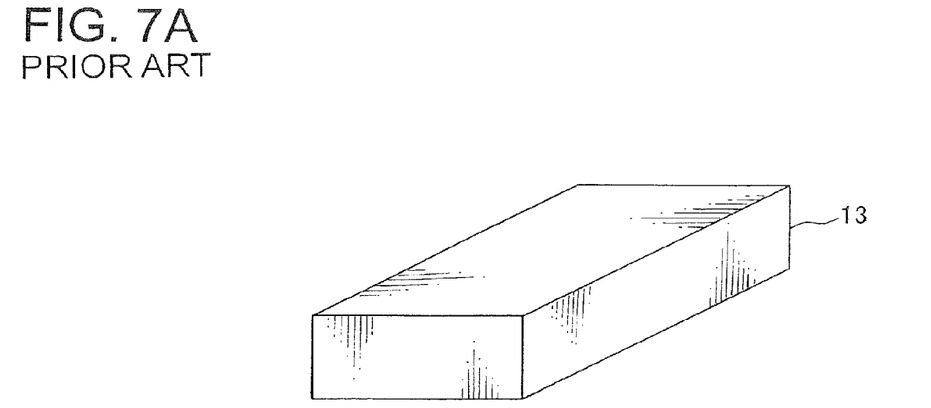
FIG. 7A is an explanatory view for explaining a production method of a metallic toned dial plate having a conventional inclined face.
Figure 7B:
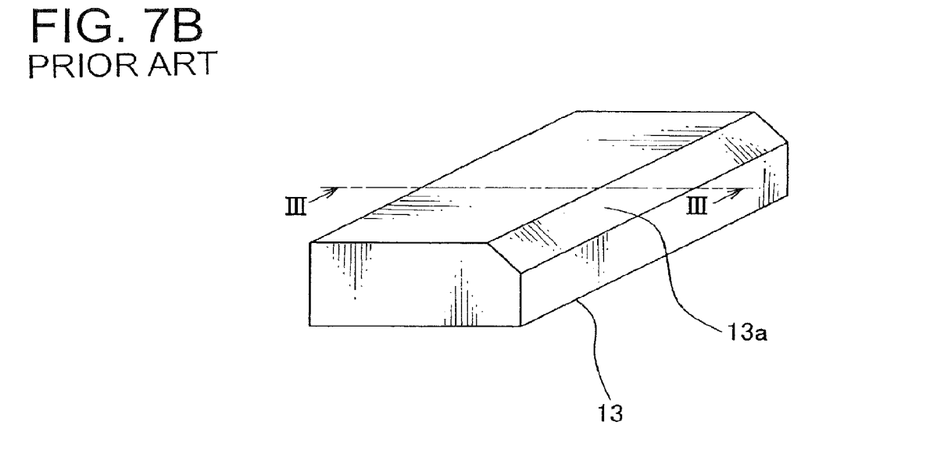
FIG. 7B is an explanatory view for explaining the production method of a metallic toned dial plate having the conventional inclined face.
Figure 7C:
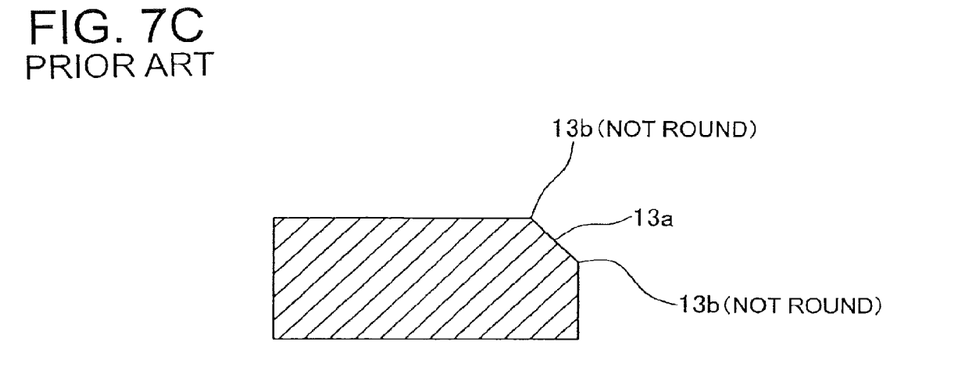
FIG. 7C is a sectional view taken on line III-III of FIG. 7B.

Incidentally, as shown in FIGS. 7A to 7C, when an inclined face 13a is provided by cutting a metal block 13 like a conventional way, a connecting portion 13b is not formed in a curved face. As described above, when the radii R of the connecting portions 71m, 71n are equal to or lower than 0.2 millimeters, a physical appearance of the connecting portions 71m, 71n is substantially the same as a connecting portion 13b of a metallic dial plate provided with an inclined face 13a formed by cutting a metal block 13, and the high-class feeling is improved.

The metallic layer 72 is formed on a front face of the main body 71 by surface treatment such as evaporation (including sputter), plating, or coating. A thickness of the metallic layer 72 is provided thinner than a height of the corrugated face (a distance between a top of a convex and a bottom of concave). By providing the thin metallic layer 72, the metallic layer 72 provided on the corrugated face of the main body 71 also becomes corrugated, and looks like the corrugated face provided on the metal plate. This metallic layer 72 is formed on the first design face 71c except the graduation design 71k, and on the second design face 71d except the numeral design 71l. Thereby, when the light of the LED 10 enters the metallic toned dial plate 7 from a rear side of the metallic toned dial plate 7, the graduation design 71k and the numeral design 71l are glittering.

The metallic toned dial plates 7 of the water temperature meter 3c and the fuel meter 3d may have the same configuration as the above described metallic toned dial plate 7 of the speedometer 3a and the tachometer 3b. Alternatively, only the metallic layer 72 in which the design portion is cut off may be provided on a front side of a flat main body 71 without providing the convex 71b.

Further, electronic components such as later-described movement 9, LED 10, and a microcomputer controlling them are mounted on the wiring board 4. The bezel 5 is attached to a front side of the case main body 21. A plurality of exposing windows for exposing the metallic toned dial plates 7 to a crew and for shielding the other portions except the metallic toned dial plates 7 from the crew is formed on the bezel 5. The front glass 6 is made of transparent synthetic resin, and covers an opening of the bezel 5 to prevent dust or the like from entering the combination mater 1.

The pointers 8 are provided on a front side of the metallic toned dial plates 7 and respectively indicate the speed, the number of revolutions, water temperature, and the remaining fuel. The LED 10 is disposed on the wiring board 4 and emits light from a rear side of the metallic toned dial plate 7. The movement 9 is composed of a well-known stepping motor, and rotates the pointer 8.

Figure 8:
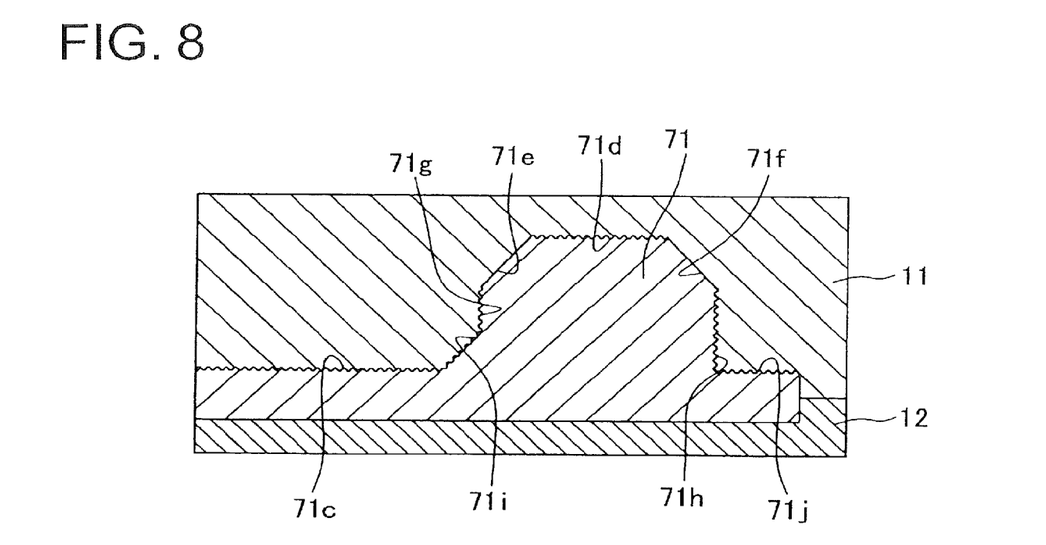
FIG. 8 is an explanatory view for explaining a production method of the metallic toned dial plate shown in FIG. 1.

Next, a production method of the above-described metallic toned dial plate 7 will be explained with reference to FIG. 8. First, the main body 71 is resin-molded using first and second molding dies 11, 12. The first molding die 11 is used for forming a front side of the main body 71, and portions corresponding to the first inwardly inclined face 71e and the outwardly inclined face 71f are formed in a smooth face of which surface roughness is equal to or lower than 2 micrometers by polishing.

Further, portions of the first molding die 11 for forming the first design face 71c, the second design face 71d, the inner side face 71g, the outer side face 71h, the second inwardly inclined face 71i, and the outer side face 71h are formed in a corrugated face made by texturing or the like. Thereby, the smooth face and the corrugated face of the first molding die 11 is copied to the main body 71, and the smooth face and the corrugated face is formed on the metallic toned dial plate 7. Then, the metallic layer 72 is formed by surface treatment, and the production of the metallic toned dial plate 7 is completed.

According to the above metallic toned dial plate 7, the main body 71 is made of resin, and the smooth face and the corrugated face are provided on a surface of the main body 71, and the metallic layer 72 is formed on a mirror face and the corrugated face of the main body 71 by surface treatment. Thereby, the metallic toned dial plate 7 having the smooth face and the corrugated face can be produced without processing a metal plate, and the metallic toned dial plate 7 producing a metallic feeling can be provided at low cost. Further, the metallic feeling can be produced without illuminating the metallic toned dial plate 7.

Further, according to the above metallic toned dial plate 7, the main body 71 is provided with the circular second design face 71d, and the outwardly inclined face 71f and the first inwardly inclined face 71e rimming an inside and outside of the second design face 71d. The outwardly inclined face 71f and the first inwardly inclined face 71e are provided on the smooth face. Thereby, edges outside and inside of the second design face 71d glitter, and the metallic feeling is further improved.

Further, according to the above metallic toned dial plate 7, the radii of the connecting portions 71m, 71n (see FIG. 6) are formed equal to or lower than 0.2 millimeters. Therefore, the physical appearance of the connecting portions 71m, 71n is substantially the same as the connecting portion 13b of the metal plate provided with the inclined face 13a by cutting the metal block 13 shown in FIG. 7A. Therefore, the high-class feeling is improved.

Further, according to the above metallic toned dial plate 7, because a surface roughness of the smooth face of the main body 71 is formed equal to or lower than 2 micrometers, a shiny feeling is produced, and the metallic feeling is further improved.

Further, according to the above metallic toned dial plate 7, the graduation design 71k and the numeral design 71l are formed on the first design face 71c and the second design face 71d provided with the corrugated face. The metallic layer 72 formed on the smooth face becomes a mirror surface, and reflects light strongly. Therefore, when strong light such as the late afternoon sun directly enters the combination mater 1, if the graduation design 71k and the numeral design 71l are provided on the mirror surface, an indicated value will not be recognized rapidly due to a mirror reflection. However, the graduation design 71k and the numeral design 71l provided on the corrugated face prevent this.

Further, the above metallic toned dial plate 7 is a resin molding product provided with the metallic layer 72 by surface treatment. Therefore, for example, when touching by hand, a metallic cool feeling is not produced (due to a difference of the thermal conductivity). Therefore, though the metallic feeling can be improved to look at, when touching by hand, the metallic feeling may be disappeared, and the high-class feeling may be reduced. According to this embodiment, the metallic toned dial plate 7 is received in the case 2 covered by the front glass 6. Therefore, the hand cannot actually touch the metallic toned dial plate 7, and the metallic feeling is prevented from being reduced.

Incidentally, according to the above embodiment, the main body 71 is provided with the textured corrugated face. However, the present invention is not limited to this. For example, the main body 71 may be provided with a spin-hairline corrugated face.

Further, according to the above embodiment, the corrugated face is provided by texturing the first molding die 11. However, the present invention is not limited to this: If the surface roughness of the corrugated face is rougher than the polished smooth face, the texture treatment may not be carried out.

Figure 9:
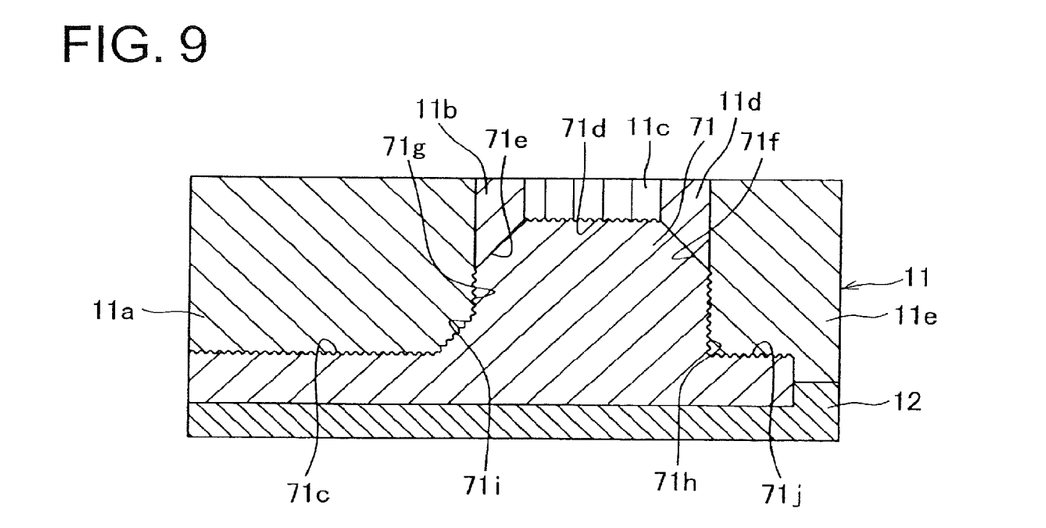
FIG. 9 is an explanatory view for explaining a production method of the metallic toned dial plate according to another embodiment.

Further, according to the above embodiment, the convex 71b is formed by one first molding die 11. However, the present invention is not limited to this. For example, as shown in FIG. 9, the first molding die 11 may be divided into a plurality of molding dies 11a to 11e. The molding die for the first inwardly inclined face 71e and the outwardly inclined face 71f for forming the smooth face may be separated from other molded dies for the second design face. 71d, the inner side face 71g, and the outer side face 71h. As shown in FIG. 8, when the main body 71 is formed by one first molding die 11, a shape of the first molding die 11 is simple, and a cost of the first molding die 11 can be reduced. However, a cutting technique of the first molding die 11 has a limit, and the radii R of the connecting portions 71m, 71n can be reduced to about 0.2 millimeters.

In contrast, as shown in FIG. 9, by forming the main body 71 with a plurality of divided molding dies 11a to 11e, the radii R of the connecting portions 71m, 71n can be substantially zero, and the high-class feeling is further improved.

Further, according to the above embodiment, the circular convex 71b is provided, and the second design face 71d (planar face) and the first inwardly inclined face 71e (inclined face) are provided on the convex 71b. However, the present invention is not limited to this. The convex 71b may be formed in an arc-shape. Further, the convex 71b may be not provided, the whole main body 71 may be formed in a planar shape, and an inclined face may be provided on an outer edge of the main body 71. Further, the whole main body 71 may be formed in a ring shape, and inclined faces may be provided on an outer edge and inner edge of the main body 71.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

REFERENCE SIGNS LIST 7 metallic toned dial plate
71 main body
72 metallic layer
71d second design face (planar face)
71e first inwardly inclined face (inclined face)
71f outwardly inclined face (inclined face)

What is claimed is:

1. A production method of a metallic toned dial plate producing a metallic feeling comprising steps of:
   producing a main body provided with a smooth face and a corrugated face on which a plurality of convexes and concaves are formed and having a surface roughness rougher than the smooth face by resin molding using a molding die provided with
   a smooth face formed as an inclined, beveled face relative to a corrugated face and formed to rim a design face formed on a convex portion, and convexes and concaves are formed on the design face and
   the corrugated face on which a plurality of convexes and concaves are formed and having a surface roughness rougher than the smooth face, and providing a metallic layer on the smooth face and the corrugated face of the main body by surface treatment, wherein the convex portion is in a circular or an arc shape centering around a rotation shaft of a pointer with a top surface being the design face thereof and being a circular or arc-shaped face, and a pair of the smooth faces are adjacent to the top surface of the convex portion to rim the design face.

2. The production method of a metallic toned dial plate as claimed in claim 1, further comprising a step of: respectively forming the smooth face and the corrugated face with individual molding dies.

3. A production method of a metallic toned dial plate producing a metallic feeling comprising steps of:

resin-molding a main body with molding, with a first molding die, a smooth face formed as an inclined, beveled face relative to a corrugated face and formed to rim a design face formed on a top surface of a convex portion of the main body, and molding, with a second molding die, the corrugated face on which a plurality of convexes and concaves are formed and having a surface roughness rougher than the smooth face; and providing a metallic layer on the smooth face and the corrugated face of the main body by surface treatment, wherein on the main body:

the smooth face is formed as an inclined, beveled face relative to the corrugated face and formed to rim a design face formed on a convex portion, and convexes and concaves are formed on the design face;

the corrugated face on which a plurality of convexes and concaves are formed has a surface roughness rougher than the smooth face;

the convex portion is in a circular or an arc shape centering around a rotation shaft of a pointer with a top surface being the design face thereof and being a circular or arc-shaped face; and a pair of the smooth faces are adjacent to the top surface of the convex portion to rim the design face.

\* \* \* \* \*